(12) United States Patent
Miyamoto

(10) Patent No.: US 7,436,563 B2
(45) Date of Patent: Oct. 14, 2008

(54) OPTICAL SCANNING APPARATUS WITH COMPOSITE COLLIMATOR-DEFLECTOR BETWEEN LASER SOURCE AND DEFLECTION SCANNER

(75) Inventor: Hideyuki Miyamoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/580,085

(22) Filed: Oct. 13, 2006

(65) Prior Publication Data
US 2007/0091404 A1   Apr. 26, 2007

(30) Foreign Application Priority Data
Oct. 13, 2005   (JP)   ............... 2005-298822

(51) Int. Cl.
*G02B 26/08* (2006.01)
*G02B 3/00* (2006.01)
*G02B 9/00* (2006.01)

(52) U.S. Cl. ..................... 359/197; 359/662
(58) Field of Classification Search ......... 359/196–197, 359/205–207, 212–219, 641, 662; 348/492; 250/234–236
See application file for complete search history.

(56) References Cited

U.S. PATENT DOCUMENTS

| | | | | |
|---|---|---|---|---|
| 5,055,663 A | * | 10/1991 | Morimoto et al. | ........... 359/662 |
| 5,900,961 A | | 5/1999 | Miyamoto et al. | ........... 359/196 |
| 6,005,243 A | * | 12/1999 | Yamazaki | ............... 359/204 |
| 6,414,777 B1 | | 7/2002 | Miyamoto | .............. 359/198 |
| 6,545,260 B1 | * | 4/2003 | Katashiro et al. | ........... 359/196 |
| 6,657,760 B2 | | 12/2003 | Fukita et al. | ................ 359/205 |

FOREIGN PATENT DOCUMENTS

| | | |
|---|---|---|
| JP | 9-230259 | 9/1997 |
| JP | 2002-40350 | 6/2002 |
| JP | 2004-87816 | 3/2004 |

* cited by examiner

Primary Examiner—Alessandro Amari
Assistant Examiner—Jennifer L Doak
(74) Attorney, Agent, or Firm—Fitzpatrick, Cella, Harper & Scinto

(57) ABSTRACT

An optical scanning apparatus includes a light source; a deflection scanner for scanningly deflecting a laser beam emitted by the light source; a deflection member for deflecting a part of the laser beam emitted by the light source, the deflection member being disposed between the light source and the deflection scanner; a common sensor for receiving the laser beam emitted by the light source; wherein the common sensor receives both of the laser beam deflected by the deflection member before it is incident on the deflection scanner and the laser beam scanningly deflected by the deflection scanner.

4 Claims, 5 Drawing Sheets

(a)

(b)

OPTICAL SCANNING APPARATUS WITH COMPOSITE COLLIMATOR-DEFLECTOR BETWEEN LASER SOURCE AND DEFLECTION SCANNER

FIELD OF THE INVENTION AND RELATED ART

The present invention relates to an optical scanning apparatus for exposing a photosensitive member to a scanning laser beam.

In an optical scanning apparatus for deflecting a laser beam by a rotatable polygonal mirror to effect scanning exposure of a photosensitive drum, a vertical cavity surface emitting laser which will hereinafter be called "VCSEL" However, the optical scanning apparatus using the VCSEL involves the following problems.

The VCSEL does not produce a back side emission light, as is different from an edge emitting type semiconductor laser. Therefore, it is impossible to receive the back side emission light by a sensor to monitor the light intensity or quantity. Therefore, it is considered to branch a part of the front side emission light and receive the part of light by a sensor, thus, providing the light to monitor.

Japanese Laid-open Patent Application 2002-040350 discloses that monitor light is branched at a position after the light passes through the aperture. Japanese Laid-open Patent Application Hei 09-230259 discloses that light which is to use as the deflection scanning light is received by a sensor for detecting the scanning start timing, wherein the light quantity is monitored using the light received by such a sensor.

However, with the structure disclosed in Japanese Laid-open Patent Application 2002-040350, the light quantity is lost by the branching. In addition, it requires an additional optical element for the branching, and the sensor has to be provided in addition to the sensor for detecting the write timing, with the result of increased cost.

Furthermore, with this structure of Japanese Laid-open Patent Application Hei 09-230259, the time period in which the writing initiation sensor receives the laser beam is relatively short, with the result of difficulty in assuring the time enough to monitor the light quantity stably.

Recently, the scanning speed of the optical scanning apparatus is increased, and the light source produces multi-beams, and therefore, it is now desired to monitor the light quantity a plurality of times within a shortening exposure period.

In addition, the light quantity can be monitored only when the deflection scanning device takes a predetermined angular position, and therefore, if the angle position is different from the predetermined position, the light quantity control operation for the light source cannot begin.

In a type in which cyclic period pulses from the writing initiation sensor is used for the rotational speed control of the deflection scanning device, the light quantity control starts after the rotational speed control for the deflection scanning device. However, there is a liability that rotational speed control for the deflection scanning device is not possible due to the weakness of the laser beam intensity before the light quantity control, for example, and if this is the case, the deflection scanning device may run out of control.

Therefore, in order to start the light quantity control, the rotational speed control has first to start for the deflection scanning device, and in order to start the rotational speed control for the deflection scanning device, the light quantity control has to start for the light source. These are contradictive to each other.

SUMMARY OF THE INVENTION

Accordingly, it is a principal object of the present invention to provide an optical scanning apparatus with which the increase in cost can be suppressed, and the time enough for the stable light quantity monitor.

It is another object of the present invention to provide an optical scanning apparatus comprising a light source; a deflection scanner for scanningly deflecting a laser beam emitted by said light source; a deflection member for deflecting a part of the laser beam emitted by said light source, said deflection member being disposed between said light source and said deflection scanner; and a common sensor for receiving the laser beam emitted by said light source; wherein said common sensor receives both of the laser beam deflected by said deflection member before it is incident on said deflection scanner and the laser beam scanningly deflected by said deflection scanner.

It is a further object of the present invention to provide an optical scanning apparatus comprising a light source; a deflection scanner for scanningly deflecting a laser beam emitted by said light source; a deflection member for deflecting a part of the laser beam emitted by said light source, said deflection member being disposed between said light source and said deflection scanner; a condenser member for condensing a part of the laser beam scanningly deflected by said deflection scanner; and a detector for detecting the laser beam emitted by said light source, said detection portion having a first sensor for detecting the laser beam deflected by said deflection member before it is incident on said deflection scanner, and a second sensor for detecting the laser beam condensed by said condenser member; wherein said condenser member and said deflection member is an integrally molded member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2, (b) shows a relation between the electric signal for light source control for the optical scanning apparatus and the time, according to the first embodiment of the present invention.

FIG. 5, (b) is a sectional view of the combination member used in the optical scanning apparatus according to the first embodiment.

DESCRIPTION OF THE PREFERRED EMBODIMENTS

Figure 1:
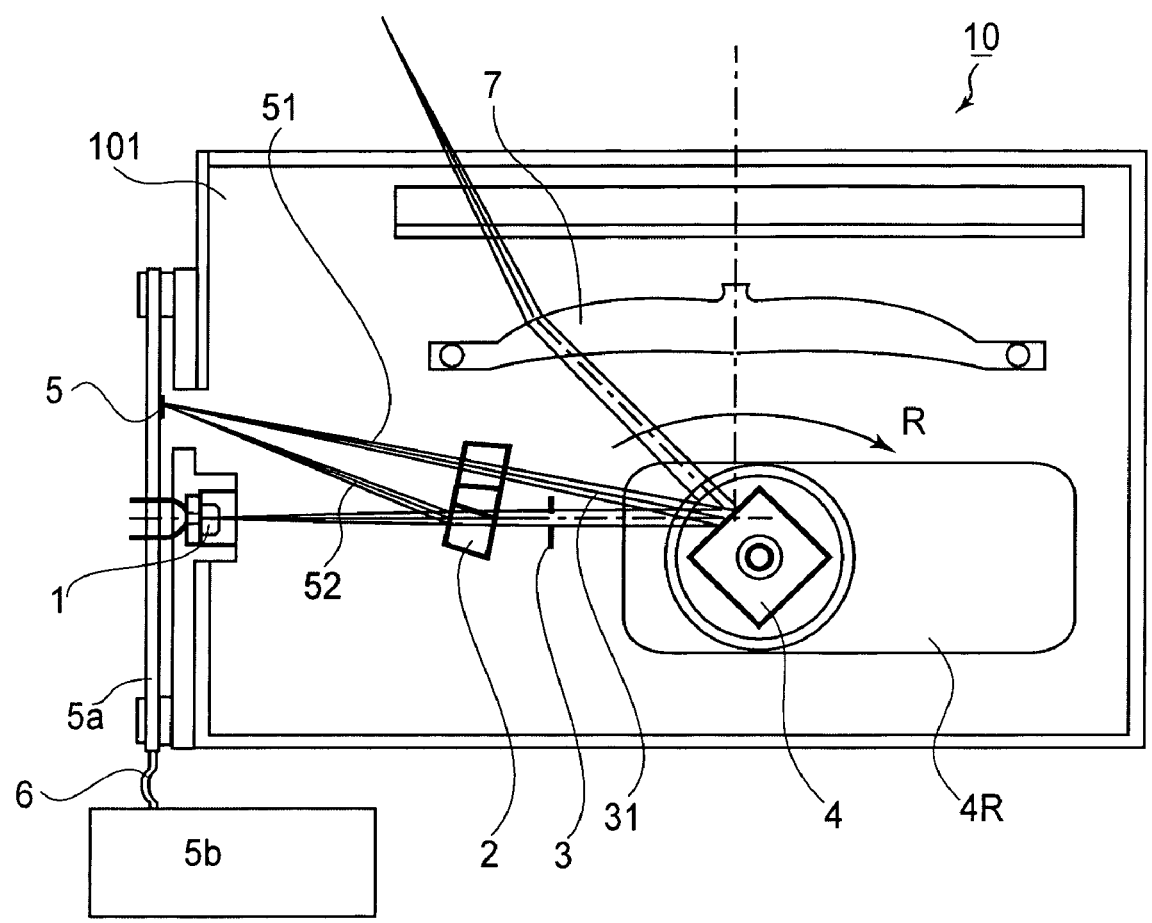
FIG. 1 shows a general arrangement of an optical scanning apparatus according to a first embodiment of the present invention.

Referring to the accompanying drawings, the preferred embodiments of the present invention will be described. The same reference numerals as with the following embodiments are assigned to the elements having the corresponding functions, and the detailed descriptions for such elements in later embodiments are omitted for simplicity.

First Embodiment

Figure 2:
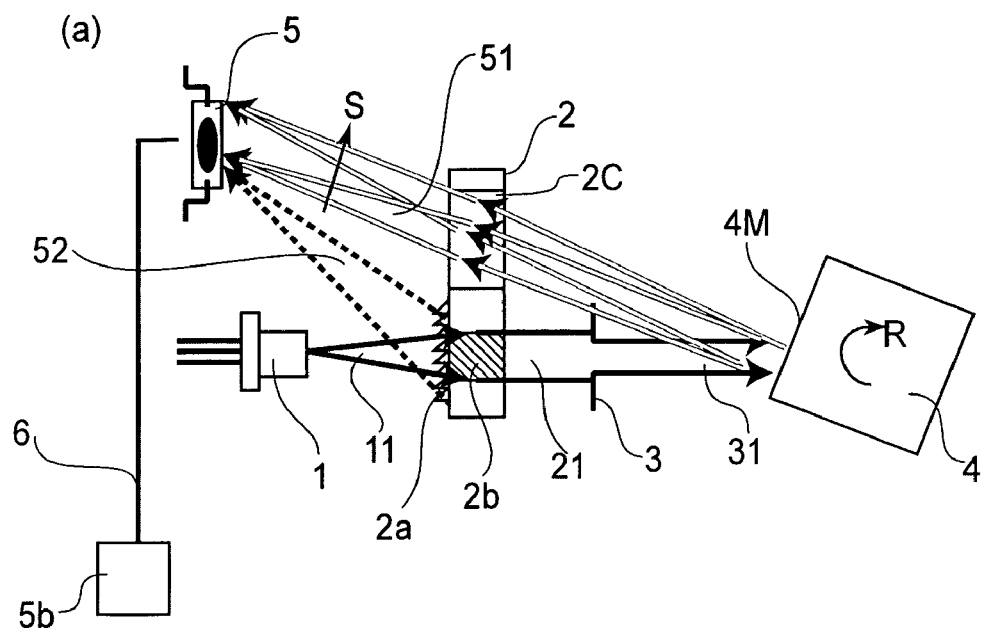
FIG. 2, (a) is a schematic view of a major part of the optical scanning apparatus according to the first embodiment of the present invention.
Figure 2:
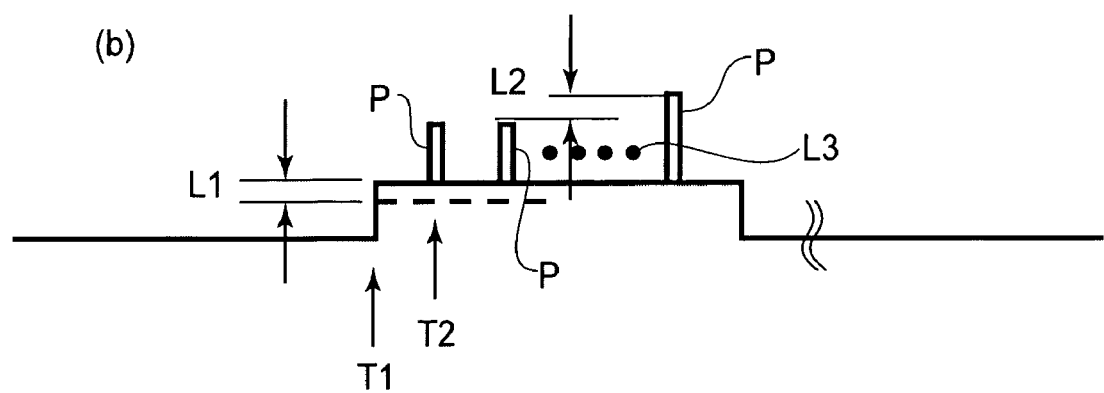

Referring to FIG. 1 and FIG. 2, (a), an optical scanning apparatus according to the first embodiment will be described. FIG. 1 shows a general arrangement of an optical scanning apparatus according to a first embodiment of the present invention. FIG. 2, (a) is a schematic view of a major part of the optical scanning apparatus according to the first embodiment of the present invention.

(Optical Scanning Apparatus 10)

Referring first to FIG. 1, the optical scanning apparatus 10 comprises a laser source unit 1 (light source), a composite lens 2 (composite member), an aperture 3, a rotatable polygonal mirror 4, a photo-receptor sensor 5, and a scanning optical system. These parts are housed in an optical box 101.

The laser source unit 1 is a vertical cavity surface emitting laser (VCSEL) which emits divergence light beam at the front side. A composite lens (composite member) 2 is a multi-function lens which includes a collimator lens 2b (hatching lines (a) FIG. 2) for collimating the laser beam and a condensation lens 2c for condensing the laser beam. The composite lens 2 reforms the laser beam by the collimator lens 2b into parallel light and directs it to the aperture 3.

The laser beam is further reformed and is incident on a rotatable polygonal mirror. The rotatable polygonal mirror 4 is rotated by a deflection device 4R to scanningly deflect the laser beam 31. Here, the deflection scanning device comprises a rotatable polygonal mirror 4 and a deflection device 4R.

The laser beam 31 scanningly deflected by the deflection scanning device the formed into a scanning spot on the photosensitive member 13 (FIG. 4) by the scanning optical system 7. The scanning spot is developed by toner and is transferred and fixed on a recording sheet.

The laser beam 31 is directed to the condenser lens 2c of the composite lens 2 rather than to the scanning optical system 7 in the upstream side. By the laser beam 51 condensed by the condenser lens 2c being incident on the photo-receptor sensor 5, writing initiation timing is detected. The light source controller 5b functions to control the laser source unit 1 to emit the laser beam modulated in accordance with the signal supplied from the photo-receptor sensor 5.

(Monitoring of Light Quantity and Writing Initiation Timing)

The monitoring operation will be described. As shown in FIG. 2, (a) the laser beam 11 emitted from the laser source unit 1 is collimated by the collimator lens 2b into a parallel light been 21. The collimated light beam 21 is reformed by the aperture 3 into a reformed laser beam 31 and is directed to the laser beam reflecting surface 4M of the rotatable polygonal mirror. The rotatable polygonal mirror 4 is rotated in the direction indicated by an arrow R by the deflection device 4R to scanningly deflect the incident laser beam 31. The scanningly deflecting laser beam 31 is converged by the condenser lens 2c of the composite lens 2 to become a scanning light 51 and then is incident on the photo-receptor sensor 5. Here, the scanning light 51 deflects in a direction indicated by an arrow S by the rotation of the rotatable polygonal mirror.

Figure 5:
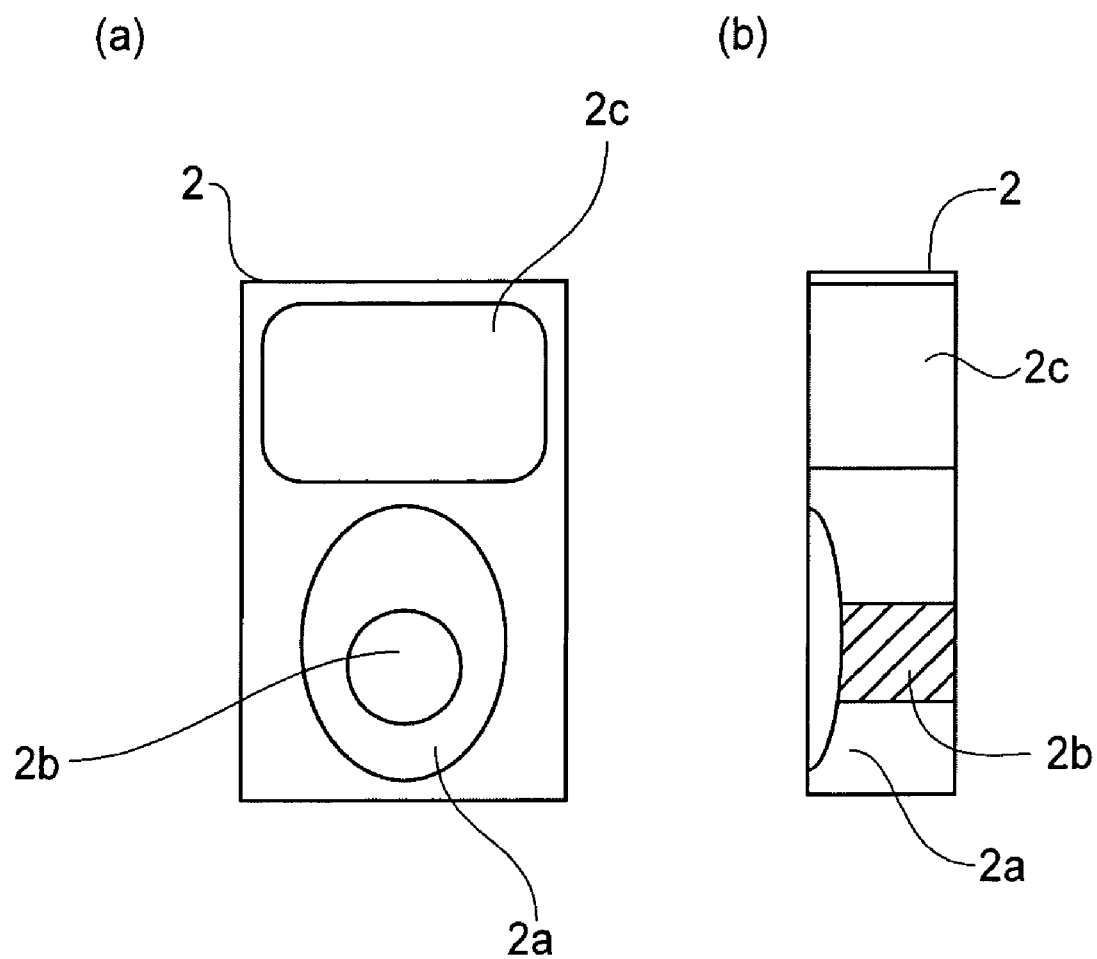
FIG. 5, (a) is a front view of a combination member used in the optical scanning apparatus according to the first embodiment of the present invention.

In addition, a part of the laser beam 11 emergent from the laser source unit 1 is reflected and converged by a diffraction grating 2a which is a reflection and convergence member provided on the surface of the composite lens 2. Referring to FIG. 5, the description will be made as to the composite lens 2. FIG. 5, (a) is a front view of the composite member used in the optical scanning apparatus according to this embodiment, as seen in the direction of the optical axis. FIG. 5, (b) is a sectional view of the composite member used in the optical scanning apparatus of this embodiment of the present invention. As shown in FIG. 5, laser beam 11 and FIG. 5, (b), the collimator lens 2b transmits and collimates the center light of the laser beam 11, and the diffraction grating 2a reflects and converges only the marginal light around the center light. The light reflected and converged is incident on the photo-receptor sensor 5 as the stationary light 52. With such a structure, is not necessary to branch the center light so that loss of the light quantity can be suppressed.

The photo-receptor sensor 5 receives both of the scanning light 51 and the stationary light 52 and produces an electric signal in response to the reception. The electric signal is fed to a light source controller 5b through a signal line 6.

FIG. 2, (b) is a diagram showing a relation between the time and the electric signal for the light source control in the optical scanning apparatus according to the first embodiment of the present invention. In FIG. 2, (b), the abscissa represents the time, and the ordinate represents the voltage. As shown in FIG. 2, (b), the rising of the voltage at T1 corresponds to the incidence of the stationary light 52 on the photo-receptor sensor 5 upon the start of the light emission of the laser source unit 1. At this time, the rotatable polygonal mirror the has not yet been rotated.

The electric signal from the photo-receptor sensor 5 is as indicated by voltage L1 (it varies within a predetermined range as shown in FIG. 2, (b)), and the light source controller 5b controls the laser source unit 1 so as to provide a constant light quantity (intensity).

When the rotatable polygonal mirror 4 starts rotating, the scanning light 51 is incident on the photo-receptor sensor 5. The time T2 corresponds to the incidence of the scanning light on the photo-receptor sensor 5. The short pulse P appearing at T2 provides an edge which functions as a reference for the writing initiation timing of the scanning line. The pulse P periodically appears by the respective reflecting surfaces 4M of the rotatable polygonal mirror 4.

The top of the pulse P is as high as the voltage L2 which is the stationary light 52 plus scanning light 51, and there is a small variation similarly to the voltage L1. By modulating the laser source unit 1 on the basis of the electric signal using the edge as the reference, the desired image data can be projected for the latent image.

The voltage L2, in a long term, varies in the level as shown in FIG. 2, (b), in the manner different from the change of the voltage L1, due to optical variation of the laser source unit 1 attributable to temperature rise. The voltage L2 is equivalent to the amount of the laser beam eventually incident on the photosensitive member 13 for the exposure thereof. Therefore, the light source controller 5b carries out not only the light quantity control using the voltage L1 but also such a control a control as to make the voltage L2 constant in a long term.

As will be understood from the foregoing, both of the stationary light 52 and the scanning light is received by one photo-receptor sensor 5 and is used for the signal process. By this, it is not necessary to provide an additional sensor, but the same sensor can be used for monitoring the light quantity and for determining the writing initiation, so that increase in cost can be suppressed.

In addition, the light quantity is monitored with the first level state (voltage L1) provided by the stationary light 52. By doing so, it can be avoided that light quantity control is impossible without rotation of the rotatable polygonal mirror 4 as is the case of the processing only by the scanning light. In other words, the light quantity control is possible using the stationary light 52 even when the rotatable polygonal mirror 4 is not rotated.

Thus, the system contradiction that in order to start the light quantity control the rotational speed control of the deflection scanning device has to be already started, and in order to start the rotational speed control of the deflection scanning device the light quantity control of the light source has to be already started, can be avoided.

The stationary light 52 not the scanning light 51 which is short in the duration of incidence is always incident on the photo-receptor sensor 5. Therefore, the light quantity can be stably monitored. In addition, the light quantity can be carried out a plurality of times irrespective of the projection time of the scanning light 51, and this embodiment is suitable for the speeding up of the optical scanning apparatus and for multi-beam scanning.

Furthermore, in this embodiment, the monitor of the light quantity and the determination of the scanning start timing are carried out with the second level state (voltage L2) provided by the scanning light 51. By this, the problem that light quantity control of the laser beam per se which is projected to the photosensitive member 13 cannot be controlled with the processing using the stationary light 52 only, can be avoided. This is accomplished by the light quantity control for the laser beam per se which is incident on the photosensitive member 13, so that image quality stabilization is further improved.

In addition, only the marginal light around the central part of the laser beam is reflected and converged by the diffraction grating 2a, and the reflected and converged stationary light 52 is incident on the photo-receptor sensor 5. By this, the laser beam 11 to be incident on the photosensitive member 13 is not used only for the light quantity monitoring, and therefore, the loss of the light quantity can be suppressed.

The present invention is not limited to this embodiment. For example, the laser source unit 1 may be non-VCSEL type, namely, an edge emitting type semiconductor laser. The means provided on the surface of the composite lens 2 is not limited to the diffraction grating 2a use in this embodiment, but it will surface if it has a function of deflecting the laser beam. Therefore, in place of the diffraction grating 2a, a beam splitter or a half-mirror is usable wherein both of the stationary light 52 and the scanning light 51 are received by one photo-receptor sensor 5 to process the signal, and there is no need of providing an additional sensor, so that increase in cost can be suppressed. In addition, in place of the rotatable polygonal mirror, a galvano-mirror or a resonance type mirror is usable with the same advantageous effects.

Second Embodiment

In the first embodiment, the photo-receptor sensor 5 has a unified structure, in the second embodiment, two photo-receptor sensors 50a and 50b are disposed closely adjacent to each other, wherein they are provided integrally on a substrate comprising the laser source unit 1. The same reference numerals as with the foregoing embodiment are assigned to the elements having the corresponding functions, and the detailed descriptions for such elements are omitted for simplicity.

Figure 3:
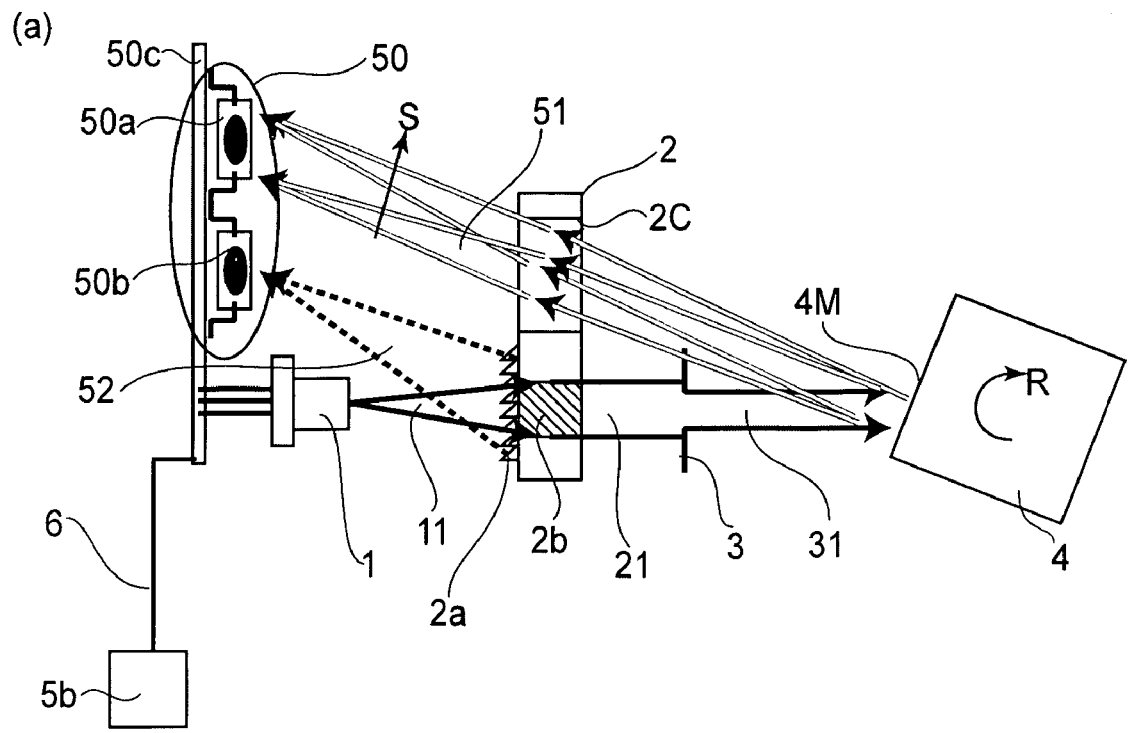
FIG. 3 is a schematic view of a major part of an optical scanning apparatus according to a second embodiment of the present invention.
Figure 3:
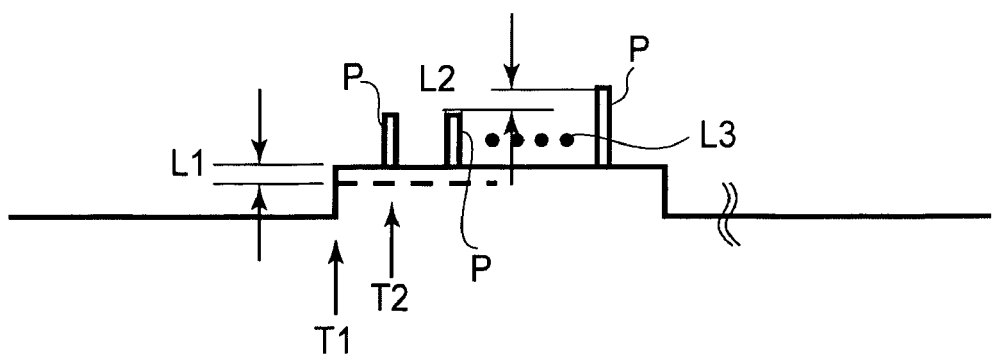

FIG. 3 is a schematic view of a major part of an optical scanning apparatus according to the second embodiment of the present invention. As shown in FIG. 3, one of the sensors namely the photo-receptor sensor (second sensor) 50a receive the scanning light, and the other sensor namely the photo-receptor sensor (first sensor) 50b receives the stationary light 52. The first sensor 50b and the second sensor 50a are disposed closely to each other to constitute a detection portion 50. The detection portion 50 is provided on the substrate 50c together with the laser source unit 1. The composite lens 2 comprises a diffraction grating 2a which is a reflecting and converging member for reflecting and converging the laser beam 11 emergent from the light source and a condenser lens 2c which is a condenser member for condensing the laser beam 31 scanningly deflected by the rotatable polygonal mirror 4, wherein the diffraction grating 2a and the condenser lens 2c are integrally formed.

With such a structure, too, the detection portion receives the light at the regions where the stationary light 52 and the scanning light are close to each other, so that time period enough to stably monitor the light quantity can be assured, and therefore, the above-discussed system contradiction can be avoided. The integral structure between the substrate for the sensor and the substrate for the light source and the integrally molded structure between the deflection member and the condenser member are contributable to accomplish downsizing of the optical scanning apparatus 10.

The present invention is not limited to the first or second embodiment. For example, the laser source unit 1 may be other than the VCSEL type, such as an edge emitting type semiconductor laser. It will suffice if the member provided on the surface of the composite lens 2 has a function of deflecting the laser beam, and it may be a beam splitter or a half-mirror, for example. In addition, the rotatable polygonal mirror 4 may be replaced with a galvano-mirror or a resonance mirror.

(Image Forming Apparatus)

Figure 4:
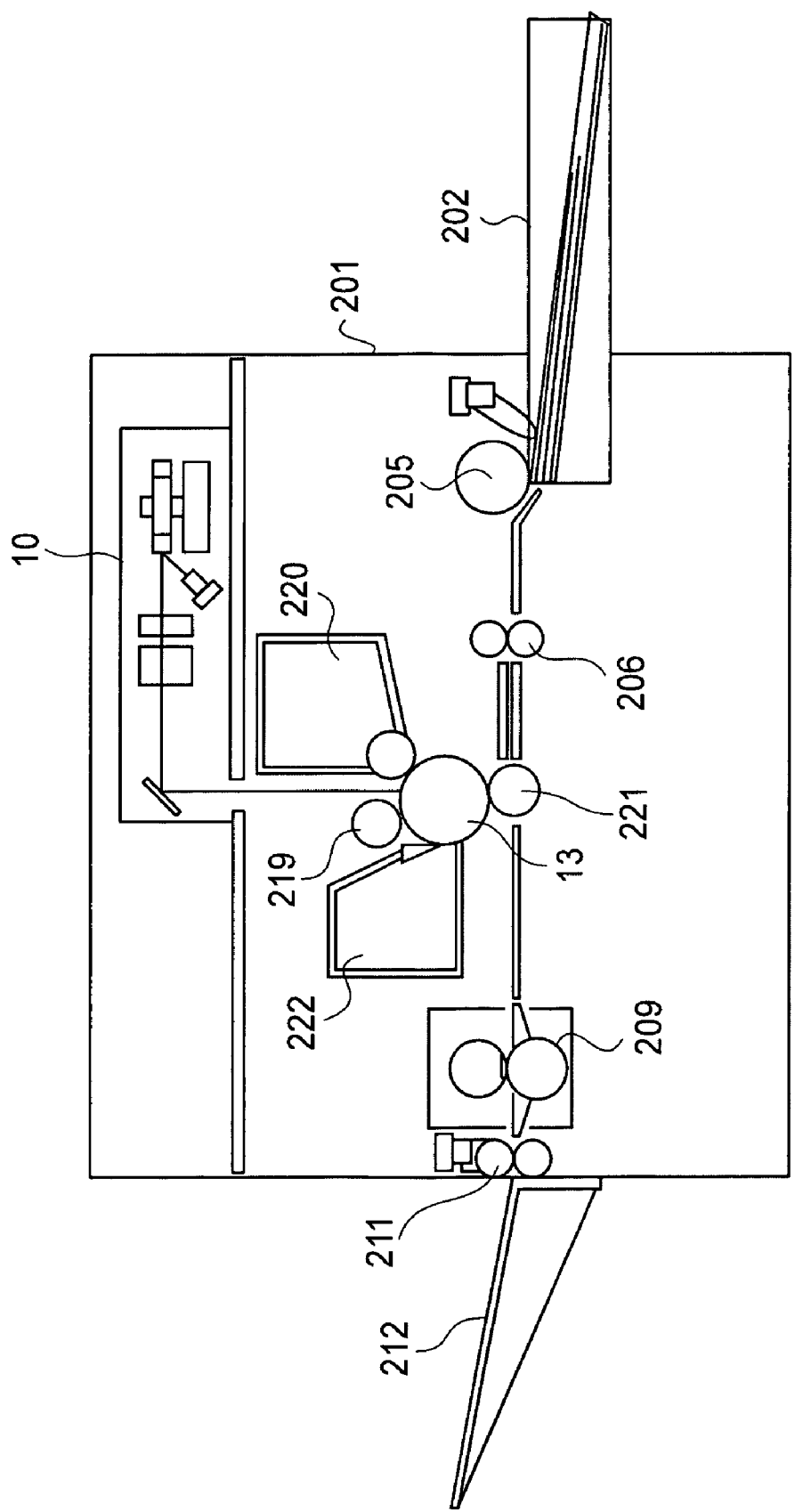
FIG. 4 shows a general arrangement of an image forming apparatus to which the optical scanning apparatus according to the present invention is applicable.

Referring to FIG. 4, the description will be made as to an image forming apparatus to which the optical scanning apparatus of the present invention is applicable. FIG. 4 is an illustration of an image forming apparatus to which the optical scanning apparatus of the present invention is applicable.

As shown in FIG. 4, the image forming apparatus comprises a main assembly of the laser beam printer 201 and an optical scanning apparatus 10. The optical scanning apparatus 10 scans the photosensitive member 13 (image bearing member) with the laser beam modulated in accordance with the electric signal.

The main assembly of the apparatus 201 comprises a cassette 202, a feeding roller 205, a pair of registration rollers 206, a photosensitive member 13, a charging roller 219, a developing device 220 and a cleaner 222. It also comprises a fixing device 209, a discharging roller 211, a stacking tray 212 and a transfer roller 221.

The recording sheet S accommodated in the cassette 202 is fed by the feeding roller 205 to the pair of registration rollers. The fed recording sheet S is fed into nip formed between the photosensitive member 13 and the transfer roller 221 by the pair of registration rollers 206 in synchronism with rotation of the electrophotographic photosensitive member.

On the photosensitive member 13, a toner image is formed in accordance with the modulated laser beam supplied by the optical scanning apparatus 10, and the toner image is transferred onto the recording sheet S. The primary charging roller 219 uniformly charges the photosensitive member 13. The photosensitive member 13 thus charged uniformly is exposed to the laser beam, so that electrostatic latent image is formed on the photosensitive member 13. The developing device 220 applies the toner onto the electrostatic latent image to develop the electrostatic latent image into a toner image. The cleaner 222 function to remove the residual toner which remains after the transfer of the toner image, thus cleaning the photosensitive member 13. The toner image is transferred onto the recording sheet S at the nip formed between the photosensitive member and the transfer roller 221.

The recording sheet S is then fed to the fixing device 209. The recording sheet S is subjected to a heat-press fixing operation while being fed. The recording sheet S on which the toner image is fixed is discharged by the discharging roller 211 onto the stacking tray 212.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 298822/2005 filed Oct. 13, 2005 which is hereby incorporated by reference.

What is claimed is:

1. An optical scanning apparatus comprising:
    a light source;
    a deflection scanner for scanningly deflecting a laser beam emitted by said light source;
    a deflection member for deflecting a part of the laser beam emitted by said light source, said deflection member being disposed between said light source and said deflection scanner;
    a common sensor for receiving the laser beam emitted by said light source; and
    a lens for collimating the laser beam emitted by said light source,
    wherein said lens is a composite member integral with said deflection member,
    wherein said common sensor receives both of the laser beam deflected by said deflection member before it is incident on said deflection scanner and the laser beam scanningly deflected by said deflection scanner;
    wherein said deflection member reflects a part of the laser beam emitted by said light source and converges the part of the laser beam; and
    wherein said lens of said composite member is disposed at such a position as to transmit a central part of the laser beam emitted by said light source and to collimate the laser beam, and said composite member further comprising a reflection and convergence member disposed at such a position as to reflect a marginal part of the laser beam which is around the central part.

2. An apparatus according to claim 1, wherein said light source includes a vertical cavity surface emitting laser.

3. An apparatus according to claim 1, further comprising a light source controller for controlling said light source, wherein said light source controller controls a light quantity and light emission timing of said light source on the basis of an output of said sensor.

4. An apparatus according to claim 3, wherein the output of said sensor includes a first level state provided by the laser beam deflected by said deflection member and a second level state provided by the laser beam scanningly deflected by said deflection scanner, and wherein said light source controller controls the light quantity of said light source with the first level state and controls the light quantity and the light omission timing of said light source with the second level state.

* * * * *